Figure 1:
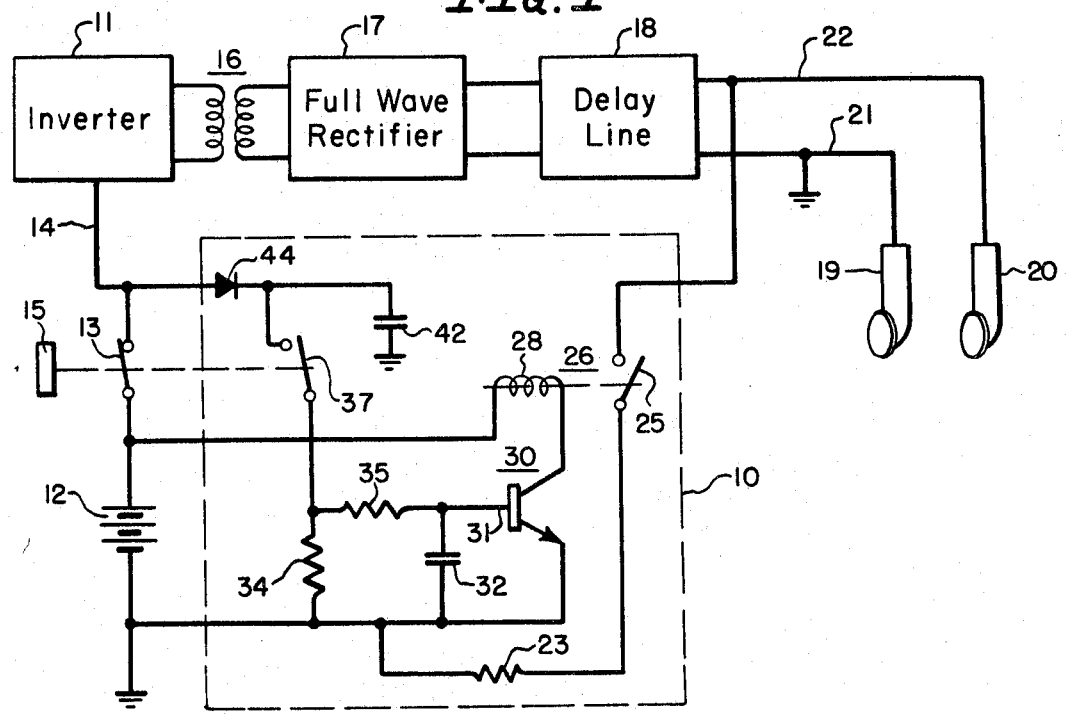

INVENTORS
Roman Buchowski
Louis L. Kocsis
By Francis W. Carty
Attorney

United States Patent Office 3,389,704
Patented June 25, 1968

3,389,704
DISCHARGE CIRCUIT FOR A DEFIBRILLATOR
Roman Buchowski, Wheeling, and Louis L. Kocsis, Elmhurst, Ill., assignors to Zenith Radio Corporation, Chicago, Ill., a corporation of Delaware
Filed Dec. 6, 1965, Ser. No. 511,832
5 Claims. (Cl. 128—419)

The present invention relates to an energy discharge circuit, and more particularly to an energy dissipation circuit for providing prompt discharge of a high voltage energy storage source associated with certain electrical equipment and for preventing accidental shock therefrom when the equipment is in an off condition. Although the invention possesses general utility for its intended function, it is especially well suited for use in a portable battery operated electronic defibrillator and accordingly will be described in that context.

A defibrillator is now a well-known medical electronic device useful in terminating fibrillation of the human heart, that is, an uncontrolled or arhythmic expansion and contraction of various groups of heart muscles. This state may be induced by accidental electric shock or by severe stress as in the case of surgical operations, heart attacks, drownings or the like. When encountered, prompt and effective counter-measures must be taken if the patient is to survive. It is well-known that defibrillation, or reinstitution of rhythmic muscle operation in the heart, may be achieved by the application of a controlled electric shock thereto and a number of devices for effecting this purpose have been proposed.

One device which has proved particularly well suited to this end in extensive clinical testing, and which is further adapted for portable emergency on the site use, is illustrated and claimed in a copending application of Walter S. Druz, Ser. No. 291,703, filed July 1, 1963 now Patent No. 3,258,013, and assigned to the same assignee as the present invention. In the Druz application, there is shown an electronic defibrillator energized from a wholly self-contained battery power supply and comprising an inverter and a full-wave rectifier for converting low voltage battery energy to high voltage energy which is stored in a delay line pulsing circuit. The delay line circuit includes a plurality of capacitors for storing a predetermined electrical charge and inductive means for appropriate shaping of the waveform on discharge. In operation, the delay line is charged over a period of time to accumulate the necessary energy and then discharged, over a time interval short with respect to the charging time, through a pair of electrodes placed at spaced locations on opposite sides of the patient's heart. Since a relatively long period of time is required to charge the delay line, it is customary to maintain the delay line in a fully charged condition on standby when possible use of the defibrillator is contemplated. In the event that use proves unnecessary or the operator has inadvertently charged the delay line to a higher voltage level than ordered by the attending physician, it is desirable to effect partial or total discharge so that the line can be promptly recharged to a proper voltage level; in the case of turning the defibrillator off, prompt discharge is desirable to avoid possible accidental electric shock. In addition, since the defibrillator operates from a battery power source, it is preferred that the discharge circuit not continually load the battery supply nor at any time require a large amount of power for its operation. Furthermore, the circuit should not, for obvious reasons, complicate operation of the defibrillator.

It is therefore an object of the present invention to provide a discharge circuit consistent with the above-noted objectives.

It is a further object of the present invention to provide means for automatically discharging a high voltage energy storage means when the storage means is disconnected from its energy supply source.

It is a more specific object of the present invention to provide, in an electronic defibrillator of the type employing means for storing high voltage electrical energy supplied from a battery source, a circuit operable to totally or partially discharge the storage means upon turning the defibrillator off to avoid possible accidental electric shock.

It is yet another object of the invention to provide a discharge circuit of the above type which requires only a small amount of power for its operation.

In accordance with the invention, there is provided in an electronic defibrillator of the type employing first capacitor means for storing high voltage electrical energy supplied from a direct current energy source and electrode means for discharging the stored energy through a patient, an energy discharge circuit for the first capacitor means. This circuit comprises second capacitor means, a discharge circuit for the second capacitor means, an on-off switch for the defibrillator including means for coupling the second capacitor means to the direct current source only when the on-off switch is in its on position, a relay including an energizing coil and a pair of normally open contacts and a resistance coupled in series with the normally open relay contacts across the first capacitor means. Further means are provided for coupling the second capacitor means to the discharge circuit only when the on-off switch is in its off position and for energizing the relay coil for a predetermined interval of time.

Figure 2:
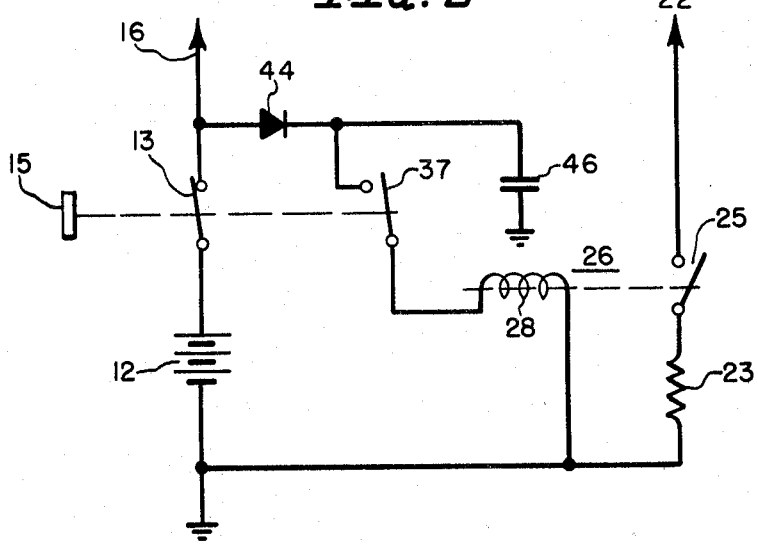

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 illustrates a preferred embodiment of the present invention as used in a battery operated portable defibrillator unit; and FIGURE 2 illustrates an alternate embodiment of the invention.

Referring now to FIGURE 1, there is shown in block form a portable battery operated defibrillator including within a dashed outline 10 a preferred embodiment of the circuit of the present invention. More particularly, the illustrated defibrillator comprises a transistorized inverter 11 energized from a self-contained battery supply 12 through the closed contacts of an on-off switch 13 and an input lead 14 of the inverter. Switch 13, illustrated in its on position, is operated by an on-off control knob 15 preferably located on the front control panel of the defibrillator enclosure. Inverter 11 is also provided with an output to the primary winding of a step-up transformer 16, the secondary winding of transformer 16 being coupled to a full-wave rectifier 17. Rectifier 17 is in turn coupled to an energy storage means, preferably constituting a delay line discharge pulsing circuit 18 having first capacitor means for storing high voltage electrical energy and a plurality of inductors for appropriately shaping the discharge waveform from the storage capacitors. A pair of electrodes 19 and 20 are coupled respectively to a grounded output terminal 21 and a high potential output terminal 22 of delay line 18. The electrodes are adapted to be applied to the body of a patient at spaced locations on opposite sides of the heart during operation of the defibrillator.

In accordance with the teachings of the aforementioned Druz application, the defibrillator further preferably includes a transistorized control circuit coupled between delay line 18 and inverter 11 for alternately enabling and disabling the inverter to maintain the charge stored in delay line 18 at a preselected value over a prolonged period of time; however, for simplicity, this circuit is not illustrated herein. The structural details of inverter 11, rectifier 17 and delay line 18 are also not illustrated as they are not of essential moment to the subject invention and for present purposes may be of any suitable, known construction. However, a preferred embodiment of these circuits for providing a defibrillation waveform of a unique and highly effective duration, energy content and wave-shape is disclosed and claimed in the aforementioned Druz application.

Circuit 10, which as will be shown uniquely cooperates with the defibrillator, includes a resistance 23 connected in series with a pair of normally open contacts 25 of a relay 26 between high potential terminal 22 and ground terminal 21 of delay line 18. An energizing coil 28 for relay 26 is coupled in a series circuit with battery 12 through the principal electrodes of a semiconductor switch 30. Herein semiconductor switch 30 is a normally nonconductive NPN transistor having its collector and emitter electrodes coupled in the aforesaid series energizing circuit for coil 28. A base electrode 31 of transistor 30 is provided with a discharge circuit comprising a capacitor 32 shunting the base and emitter electrodes of transistor 30 and a resistor 34 connected in parallel with capacitor 32 through a series resistance 35. The common junction of resistances 34, 35 is returned to a movable contact of an additional switch means 37. As denoted in the drawing by the dashed line extending from control knob 15 through switches 13 and 37, these switches are ganged for concurrent operation such that closure of switch 13 opens switch 37 and vice versa. Further, although switches 13 and 37 are shown for convenience in the drawing to be opened and closed by longitudinal movement of on-off control knob 15, it is to be understood and is preferred that these switches be controlled by rotation of the control knob.

In addition to coupling inverter 11 to battery 12, switch 13 includes means for coupling a second capacitor means 42 to battery 12 when switch 13 is in its on position. A diode 44 is series coupled between switch 13 and capacitor 42 and poled to permit charging of the capacitor from the battery. Diode 44 precludes discharge of capacitor 42 other than through closed switch 37 when on-off switch 13 is moved to its off position.

In explaining the operation of the circuit of the invention, it will initially be assumed that the defibrillator is in an "on" condition to effect charging of delay line 18. Thus, switch 13 is closed and switch 37 and relay contacts 25 are open as illustrated in the drawing. In this condition, direct current from battery 12 energizes a transistorized square wave oscillator within inverter 11 to generate an alternating current voltage of square or rectangular waveform at a frequency of about 800 cycles per second. This voltage is amplified within inverter 11 by a push-pull power amplifier and the amplified alternating voltage output is stepped-up to a higher voltage by step-up transformer 16 and impressed on full wave bridge rectifier 17 to supply direct current at a higher voltage than that of battery 12. The resulting direct current output of rectifier 17 is employed to charge the storage condensers of delay line 18 to a voltage which may exceed 3200 volts.

As previously mentioned, a transistorized control circuit (not shown) may be provided to meter the voltage across the output terminals of delay line 18 and to apply a control signal to inverter 11 for alternately enabling and disabling operation of the inverter to maintain the voltage of the delay line at a constant preselected value over a long period of time despite leakage currents, etc.

In closed chest utilization of the defibrillator of FIGURE 1, electrode 20 is placed on the right border of the sternum just below the sternal notch while electrode 19 is placed on the midclavicular line near the fifth interspace, with the heart approximately midway between. For internal use, following thoracectomy, the electrodes may be applied directly across the heart itself. Upon ascertaining that the energy stored across the delay line is at the requisite level determined by the attending physician, switches (not shown) within the respective handles of electrodes 19 and 20 are closed to discharge the stored energy through the heart to accomplish defibrillation. Upon termination of the defibrillating impulses, the handle switches in electrodes 19 and 20 are released to restore the apparatus to its normal charging condition.

In the event, however, that it proves unnecessary to use the apparatus, or the delay line is inadvertently charged to a higher voltage then desired, delay line 18 may be promptly and safely discharged by merely turning control knob 15 to its off position. In this condition, switch 13 is open thereby disconnecting battery 12 from both inverter 11 and charged capacitor 42 while ganged switch 37 is closed to couple capacitor 42 to the base discharge circuit of transistor 30. Discharge of capacitor 42 through shunt resistance 34 and the additional shunt resistance comprising series current limiting resistor 35 and the base-emitter resistance of transistor 30 applies a forward bias to transistor 30 rendering it conductive and completing a series energizing circuit for coil 28 between the terminals of battery 12. The resulting closure of normally open contact pair 25 of relay 26 couples resistance 23 in shunt across output terminals 22, 21 of delay line 18 to form a discharge path for energy stored within the delay line. Contacts 25 remain closed as long as transistor 30 is sufficiently conductive to establish an energizing circuit for coil 28. Thus, it is apparent that by proper apportioning of the capacity of condenser 42 and the shunt impedance of its discharge circuit, a predetermined portion of the energy stored in delay line 18 may be dissipated in resistance 23. Preferably, the circuit time constant is such that transistor 30 is rendered nonconductive and relay contacts 25 opened immediately after delay line 18 has substantially fully discharged its stored energy through resistance 23. At this point, it is appropriate to note that the peak discharge current from delay line 18 through resistor 23 may be quite high depending, of course, on the impedance of resistor 23. For reasons of economy and practicability in the selection of relay 26, this relay is only able to pass a relatively small peak current and accordingly resistor 23 is selected to have an impedance sufficient to limit the peak current through contacts 25 to a safe value.

It will be appreciated that by the ganging of discharge control switch 37 with on-off switch 13 through a single control knob 15, the operation of the defibrillator is in no way complicated by the inclusion of the inventive circuit. Also, such coordinated operation of the on-off switch and discharge circuit eliminates the possibility of human error in failing to discharge the delay line upon turning the defibrillator off. Furthermore, since transistor 30 is only conductive for a brief interval, circuit 10 presents only a minor intermittent load to battery 12 and accordingly requires only a small amount of energy for its operation.

By way of illustration, and in no sense by way of limitation the following component values were used in a successfully operated embodiment of the circuit shown in FIGURE 1.

Resistor 23 _____ 4–1250 ohms, 10 watt resistors.
Resistor 34 _____ 6800 ohms.
Resistor 35 _____ 2200 ohms.
Capacitor 32 _____ 0.01 microfarads.
Capacitor 42 _____ 200 microfarads, 35 volts.

An alternate embodiment of the invention is shown in FIGURE 2 and like reference numerals are used to identify those components common to the two figures. The structure of the circuit of FIGURE 2 is similar to that of FIGURE 1, except that transistor 30 and its associated base discharge circuit are eliminated while capacitor 42 is replaced with a condenser 46 having a substantially higher capacity. Although requiring fewer components than the embodiment of FIGURE 1, this structure is not preferred, primarily because capacitor 46 must be undesirably large in order to supply the current required to maintain coil 28 energized for the time interval necessary to discharge the delay line.

Specifically, with the defibrillator in an "on" condition as shown in FIGURE 2, the operation of the defibrillator unit is identical to that as described in conjunction with FIGURE 1 and capacitor 46 is charged to substantially the terminal voltage of battery 12 through blocking diode 44. Upon turning the defibrillator off, however, switch 37 directly connects capacitor 46 to discharge through relay coil 28. Herein, it is the discharge time constant of relay coil 28 and capacitor 46 that determines the period of time contacts 25 will remain closed.

Thus, there has been shown a novel circuit for providing prompt discharge of a high voltage electrical storage source which circuit does not complicate control of the associated apparatus or require substantial energy for its operation. The circuit further protects the operator from possible accidental electric shock.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:
1. In an electronic defibrillator of the type employing first capacitor means for storing high voltage electrical energy supplied from a direct current energy source and electrode means for discharging said stored electrical energy through a patient, the improvement comprising:
  second capacitor means;
  a relay including an energizing coil and a pair of normally open contacts;
  a resistance coupled in series with said normally open contacts across said first capacitor means;
  a discharge circuit for said second capacitor means;
  an on-off switch for said defibrillator and including means for coupling said second capacitor means to said direct current source only when said on-off switch is in its "on" position;
  and further means for coupling said second capacitor means to said discharge circuit only when said on-off switch is in its "off" position and for energizing said relay coil from said second capacitor means for a predetermined interval of time.

2. The arrangement according to claim 1 wherein said second capacitor means consists of a single capacitor, said discharge circuit includes said relay coil in series with said single capacitor, and said further means comprises an additional switch ganged for operation with said on-off switch.

3. The arrangement according to claim 1 wherein said relay contacts can only safely pass a current less than a predetermined small value and wherein said resistance has an impedance limiting the peak current through said relay contacts to a value less than said predetermined small value.

4. The arrangement according to claim 1 wherein said second capacitor means consists of a single capacitor and wherein the means for energizing said coil comprises a normally nonconductive semiconductor switch having a pair of principal electrodes coupled in a series circuit with said relay coil and said direct current source, said semiconductor switch further having a control electrode coupled to said discharge circuit.

5. The arrangement according to claim 1 wherein said second capacitor means consists of a single capacitor and wherein said further means comprises additional switch means ganged for operation with said on-off switch and a normally nonconductive transistor having a control electrode and having emitter and collector electrodes coupled in a series circuit with said relay coil and said direct current source and wherein said discharge circuit comprises a resistor shunting the emitter and base electrodes of said transistor and said discharge circuit is coupled to said single capacitor through said additional switch means.

References Cited

UNITED STATES PATENTS 3,058,470  10/1962  Seeliger et al. __ 128—303.17 X

FOREIGN PATENTS 826,766  1/1960  Great Britain.
864,362  4/1961  Great Britain.

OTHER REFERENCES

Leeds, Journal of American Medical Association, vol. 152, No. 15, Aug. 8, 1953, pp. 1411–1413.

RICHARD A. GAUDET, *Primary Examiner.*

W. E. KAMM, *Examiner.*